(12) United States Patent
Ikeda

(10) Patent No.: US 11,573,513 B2
(45) Date of Patent: Feb. 7, 2023

(54) HEATING DEVICE, FIXING DEVICE, AND IMAGE FORMING APPARATUS

(71) Applicant: Tamotsu Ikeda, Tokyo (JP)

(72) Inventor: Tamotsu Ikeda, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/325,210

(22) Filed: May 20, 2021

(65) Prior Publication Data

US 2021/0364962 A1 Nov. 25, 2021

(30) Foreign Application Priority Data

May 22, 2020 (JP) .............................. JP2020-089585
Aug. 19, 2020 (JP) .............................. JP2020-138701

(51) Int. Cl.
*G03G 15/20* (2006.01)
*G06K 15/12* (2006.01)

(52) U.S. Cl.
CPC ....... *G03G 15/2053* (2013.01); *G06K 15/129* (2013.01)

(58) Field of Classification Search
CPC ........... G03G 15/2017; G03G 15/2039; G03G 15/2042; G03G 15/2053; G03G 2215/2003
See application file for complete search history.

(56) References Cited

U.S. PATENT DOCUMENTS

| 2008/0056755 A1* | 3/2008 | Koshida ............. G03G 15/2039 399/92 |
| 2013/0188991 A1 | 7/2013 | Kawata et al. |
| 2020/0033771 A1 | 1/2020 | Furuichi et al. |
| 2020/0103799 A1 | 4/2020 | Adachi et al. |
| 2020/0174408 A1 | 6/2020 | Furuichi et al. |
| 2020/0183307 A1 | 6/2020 | Furuichi et al. |

FOREIGN PATENT DOCUMENTS

| JP | 60-136779 | 7/1985 |
| JP | 2013-007777 | 1/2013 |
| JP | 2013-174859 | 9/2013 |
| JP | 2015-072382 | 4/2015 |

OTHER PUBLICATIONS

JP 2015072382 English machine translation, Murase, Apr. 16, 2015 (Year: 2015).*

* cited by examiner

*Primary Examiner* — Thomas S Giampaolo, II
(74) *Attorney, Agent, or Firm* — Xsensus LLP

(57) ABSTRACT

A heating device includes a housing, a heating member, a pressure member, a pair of openings, and a thermal insulator. The heating member and the pressure member extend along a longitudinal direction and press each other to form a nip portion in the housing. The heating member transfers heat to a recording medium passing through the nip portion. The pair of openings is disposed in the housing and opens facing both end portions in the longitudinal direction of the heating member so that air passes through the pair of openings. The thermal insulator is disposed inside the housing between the pair of openings and faces an outer peripheral surface of the heating member.

19 Claims, 12 Drawing Sheets

HEATING DEVICE, FIXING DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2020-089585, filed on May 22, 2020, and 2020-138701, filed on Aug. 19, 2020, in the Japan Patent Office, the entire disclosure of each of which is incorporated by reference herein.

BACKGROUND

Technical Field

Aspects of the present disclosure relate to a heating device, a fixing device, and an image forming apparatus.

Related Art

Various types of fixing devices used in electrophotographic image forming apparatus are known, and one of them is a surf fixing method that is excellent in energy saving and has a short warm-up time. In this surf fixing method, a thin fixing belt having a low heat capacity is heated from the inside by contact with a planar heater, a sheet member passing through a fixing nip is heated by the fixing belt, and an unfixed toner image carried on the sheet member is heated and fixed.

SUMMARY

In an aspect of the present disclosure, there is provided a heating device that includes a housing, a heating member, a pressure member, a pair of openings, and a thermal insulator. The heating member and the pressure member extend along a longitudinal direction and press each other to form a nip portion in the housing. The heating member transfers heat to a recording medium passing through the nip portion. The pair of openings is disposed in the housing and opens facing both end portions in the longitudinal direction of the heating member so that air passes through the pair of openings. The thermal insulator is disposed inside the housing between the pair of openings and faces an outer peripheral surface of the heating member.

In another aspect of the present disclosure, there is provided a fixing device that includes the heating device.

In still another aspect of the present disclosure, there is provided an image forming apparatus that includes the fixing device.

BRIEF DESCRIPTION OF THE DRAWINGS

The aforementioned and other aspects, features, and advantages of the present disclosure would be better understood by reference to the following detailed description when considered in connection with the accompanying drawings, wherein.

DETAILED DESCRIPTION

Figure 1A:
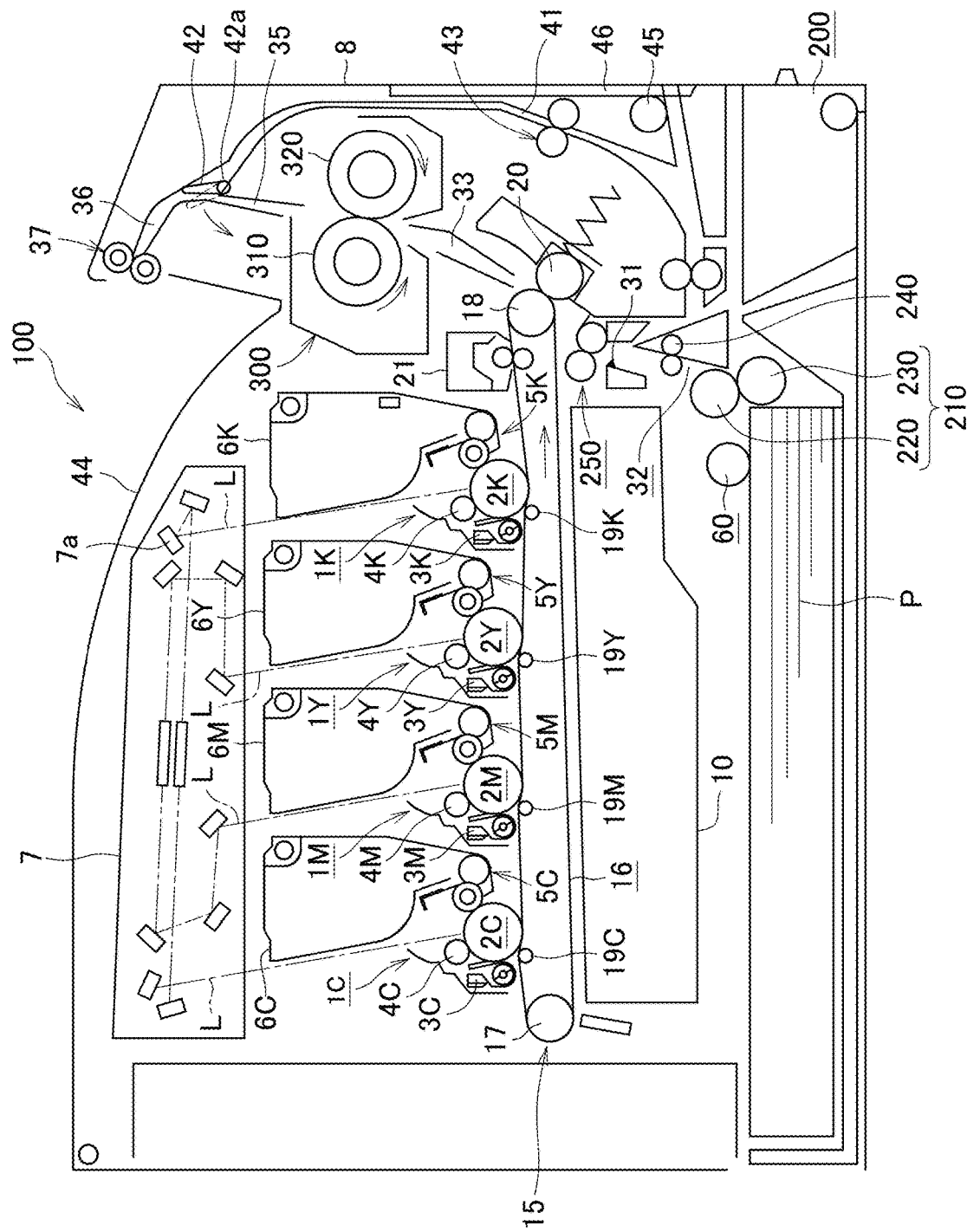
FIG. 1A is a schematic diagram illustrating a configuration of an image forming apparatus according to an embodiment of the present disclosure.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Figure 1B:
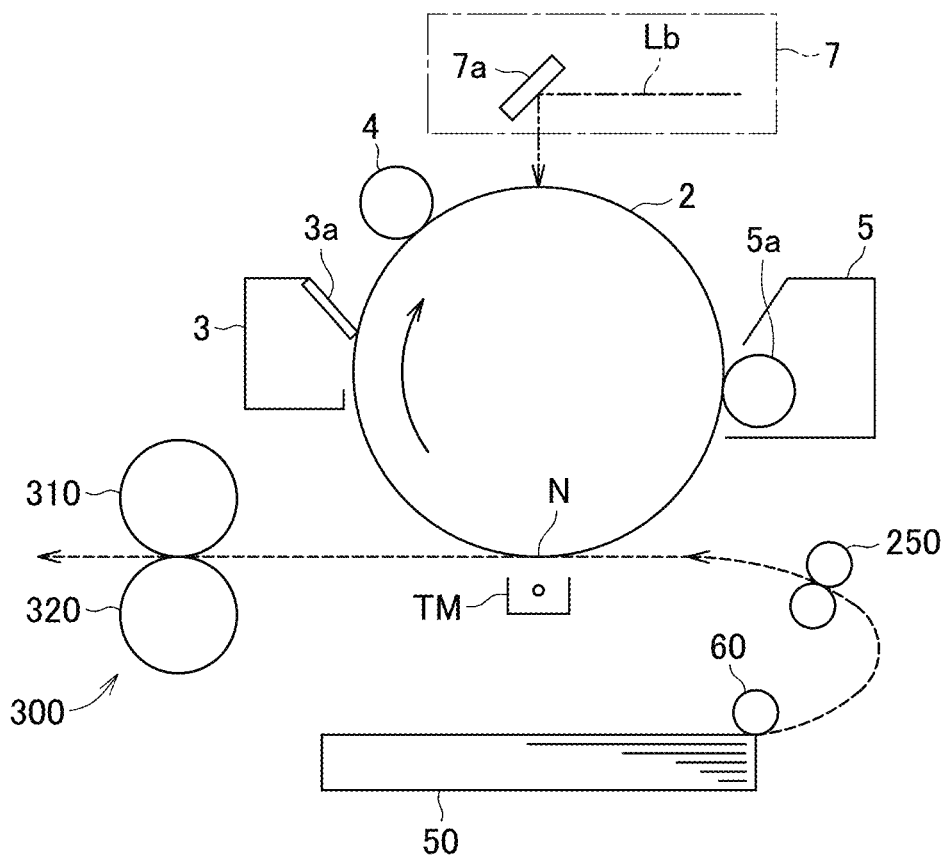
FIG. 1B is a diagram illustrating the principle of how an image forming apparatus operates, according to an embodiment of the present disclosure.

FIG. 1A is a schematic diagram illustrating a configuration of an image forming apparatus 100 that serves as a color laser printer and is provided with a heating device and a fixing device 300, according to an embodiment of the present disclosure. FIG. 1B is a schematic diagram illustrating the principle of how the color laser printer according to the present embodiment operates, in a simplified manner.

The image forming apparatus 100 includes four process units 1K, 1Y, 1M, and 1C each as an image forming device. Suffixes K, Y, M, and C are used to indicate respective colors of toner (e.g., black, yellow, magenta, and cyan) for the process units. The process units each form an image with respective developers of black (K), yellow (Y), magenta (M), and cyan (C) in color corresponding to the color separation components of a color image.

The process units 1K, 1Y, 1M, and 1C respectively include toner bottles 6K, 6Y, 6M, and 6C containing different color toners. Since the process units 1K, 1Y, 1M, and 1C have a similar structure except the color of toner, the configuration of one process unit 1K is described below as representative and descriptions of the other process units 1Y, 1M, and 1C are omitted. Thus, the configuration of the one process unit 1K is described below, and the descriptions of the other process units 1Y, 1M, and 1C are omitted.

The process unit 1K includes an image bearer 2K (e.g., a photoconductor drum), a photoconductor cleaner 3K, and a discharging device. The process unit 1K further includes a charging device 4K as a charger that uniformly charges the surface of the image bearer and a developing device 5K as a developing unit that processes visible image of an electrostatic latent image formed on the image bearer. The process unit 1K is detachably attached to a main body of the image forming apparatus 100. Consumable parts of the process unit 1K can be replaced at the same time.

An exposure device 7 is disposed above the process units 1K, 1Y, 1M, and 1C in the image forming apparatus 100. The exposure device 7 performs writing and scanning based on image data, that is, to reflect laser light L emitted from a laser diode by minors 7a based on the image data and irradiates the image bearer 2K.

A transfer device 15 is disposed below the process units 1K, 1Y, 1M, and 1C in the present embodiment. The transfer device 15 corresponds to a transfer unit TM in FIG. 1B. Primary transfer rollers 19K, 19Y, 19M, and 19C are disposed opposite the image bearers 2K, 2Y, 2M, and 2C, respectively, in contact with an intermediate transfer belt 16.

The intermediate transfer belt 16 is wound around the primary transfer rollers 19K, 19Y, 19M, and 19C, a drive roller 18, and a driven roller 17 and is rotated. A secondary transfer roller 20 is disposed opposite the drive roller 18 in contact with the intermediate transfer belt 16. Assuming that the image bearers 2K, 2Y, 2M, and 2C serve as a plurality of first image bearers of multiple colors, the intermediate transfer belt 16 serves as a second image bearer on which the images of these multiple colors are superimposed on top of one another.

A belt cleaner 21 is disposed downstream from the secondary transfer roller 20 in a direction of rotation of the intermediate transfer belt 16. A cleaning backup roller is disposed opposite the belt cleaner 21 via the intermediate transfer belt 16.

A sheet feeder 200 including a tray that loads sheets P is disposed below the image forming apparatus 100. The sheet feeder 200 is configured as a recording-medium supplying device and can store a large number of sheets P as a recording medium in a bundle. The sheet feeder 200 is unitized together with a sheet feed roller 60 and a roller pair 210 as a conveyor for the sheets P.

The sheet feeder 200 is detachably inserted in the main body of the image forming apparatus 100 to supply the sheets P. The sheet feed roller 60 and the roller pair 210 are disposed at an upper portion of the sheet feeder 200 and convey the uppermost sheet P in the sheet feeder 200 toward a sheet feeding path 32.

A registration roller pair 250 as a separation conveyor is disposed near the secondary transfer roller 20 and upstream from the secondary transfer roller 20 in a sheet conveyance direction and can temporarily stop the sheet P fed from the sheet feeder 200. By stopping the sheet P temporarily at the registration roller pair 250, slack is formed on the leading end side of the sheet P, and the skew of the paper P is corrected.

A registration sensor 31 is disposed immediately upstream from the registration roller pair 250 in the sheet conveyance direction and detects the passage of a leading end of the sheet P. When a specified period of time passes after the registration sensor 31 detects the passage of a leading end of the sheet P, the sheet P contacts the registration roller pair 250 and temporarily stops.

Conveying rollers 240 are disposed downstream from the sheet feeder 200 to convey the sheet conveyed to the right side from the roller pair 210 upward. As illustrated in FIG. 1A, the conveying rollers 240 conveys the sheet to the registration roller pair 250 upward.

The roller pair 210 includes a pair of an upper roller and a lower roller. The roller pair 210 can adopt a friction reverse roller (feed and reverse roller (FRR)) separation system or a friction roller (FR) separation system.

In the FRR separation system, a separation roller (a return roller) is applied a certain amount of torque in a counter sheet feeding direction from a driving shaft via a torque limiter and pressed against a feed roller to separate sheets in the nip between the rollers. In the FR separation system, a separation roller (a friction roller) is supported by a secured shaft via a torque limiter and pressed against a feed roller to separate sheets in the nip between the rollers.

The roller pair 210 in the present embodiment is configured as the FRR separation system. That is, the roller pair 210 includes a feed roller 220 that is an upper roller of the roller pair 210 and conveys the sheet toward the inner side of the image forming apparatus 100 and a separation roller 230 that is a lower roller of the roller pair 210 and is given driving force through a drive shaft in the opposite direction of the rotating direction of the feeding roller 220. Note also that the driving force of the driving shaft is controlled by a torque limiter.

The separating roller 230 is biased against the feed roller 220 by a biasing member such as a spring. The sheet feed roller 60 rotates counterclockwise in FIG. 1A by transmitting the driving force of the feed roller 220 via a clutch.

The registration roller pair 250 sends out the sheet P that contacts the registration roller pair 250 and has the slack on the leading end side of the sheet P toward the secondary transfer nip (a transfer nip N in FIG. 1B) between the secondary transfer roller 20 and the drive roller 18, at a suitable timing to transfer the toner image on the intermediate transfer belt 16 onto the sheet P. The toner image formed on the intermediate transfer belt 16 is electrostatically transferred to a desired transfer position of the conveyed sheet P with high accuracy by the electrical bias applied at the secondary transfer nip.

A post-transfer conveyance path 33 is disposed above the secondary transfer nip between the secondary transfer roller 20 and the drive roller 18. The fixing device 300 is disposed near an upper end of the post-transfer conveyance path 33.

The fixing device 300 includes a fixing belt 310 as a heating member including a heater, and a pressure roller 320 as a pressure member that rotates while pressing against the fixing belt 310 at a specified pressure. The fixing device 300 can be of various types as illustrated in FIGS. 2A to 2D, which is described later. First, the fixing device 300 is described according to the model of FIG. 2A.

A post-fixing conveyance path 35 is disposed above the fixing device 300 and branched into a sheet ejection path 36 and a reverse conveyance path 41 at the upper end of the post-fixing conveyance path 35. A switching member 42 is disposed at a branch portion, and the switching member 42 swings around the swing shaft 42a. An output roller pair 37 is disposed near an opening end of the sheet ejection path 36.

The reverse conveyance path 41 joins the sheet feeding path 32 at the other end opposite to the branch portion. A reversing conveyance roller pair 43 is disposed in the middle of the reverse conveyance path 41. An output tray 44 is disposed on the upper part of the image forming apparatus 100 by forming a concave shape inward of the image forming apparatus 100.

A powder container 10 (e.g., a toner container) is disposed between the transfer device 15 and the sheet feeder 200. The powder container 10 is removably attached to the main body of the image forming apparatus 100.

The image forming apparatus 100 of the present embodiment requires a specified distance from the sheet feed roller 60 to the secondary transfer roller 20 due to suitable sheet conveyance. The powder container 10 is disposed in a dead space generated at the above-described distance to reduce the size of the entire laser printer.

A transfer cover 8 is disposed above the sheet feeder 200 and in front of the sheet feeder 200 in the drawing direction. The transfer cover 8 can be opened to check an interior of the image forming apparatus 100. The transfer cover 8 includes a manual sheet feed roller 45 for manual sheet feeding and a manual sheet feed tray 46 for the manual sheet feeding.

Next, the basic operation of the laser printer according to the present embodiment is described below with reference to FIG. 1A. First, the operation of a single-side printing is described.

As illustrated in FIG. 1A, the sheet feed roller 60 is rotated by a sheet feeding signal from the controller of the image forming apparatus 100. The sheet feed roller 60 separates only the uppermost sheet of the bundled sheet P loaded on the sheet feeder 200 and feeds it to the sheet feeding path 32.

After the sheet feed roller 60 and the roller pair 210 feed the sheet P, when the leading end of the sheet P reaches a nip of the registration roller pair 250, the sheet P forms the slack and temporarily stops. The registration roller pair 250 corrects the skew on the leading end side of the sheet P and rotates in synchronization with an optimum timing to transfer a toner image formed on the intermediate transfer belt 16 onto the sheet P.

When the sheet P is fed from the manual sheet feeding tray 46, the sheets P of the sheet bundle loaded on the manual sheet feeding tray 46 are fed one by one from the uppermost sheet placed on top of the sheet bundle by the manual sheet feed roller 45. Then, the sheet P passes part of the reverse conveyance path 41 to be conveyed to the nip of the registration roller pair 250. The subsequent operations are the same operations as the sheet feeding operations from the sheet feeder 200.

As to image formation, operations of the process unit 1K is described as a representative, and the descriptions of the other process units 1Y, 1M, and 1C are omitted. First, the charging device 4K uniformly charges the surface of the image bearer 2K to high potential. The exposure device 7 emits a laser light L onto the surface of the image bearer 2K according to image data.

The surface of the image bearer 2K irradiated with the laser light L has an electrostatic latent image due to a drop in the potential of the irradiated portion. The developing device 5K includes a developer bearer bearing a developer including toner and transfers unused black toner supplied from the toner bottle 6K to the surface portion of the image bearer 2K having the electrostatic latent image, through the developer bearer.

The image bearer 2K to which the toner has been transferred forms (develops) a black toner image on the surface of the image bearer 2K. The black toner image formed on the image bearer 2K is transferred onto the intermediate transfer belt 16.

The photoconductor cleaner 3K removes toner remaining on the surface of the image bearer 2K after the primary-transfer process. The removed residual toner is conveyed by a waste-toner conveyance unit and collected to a waste-toner container in the process unit 1K. The discharging device discharges the remaining charge on the image bearer 2K from which the remaining toner is removed by the photoconductor cleaner 3K.

Similarly, toner images are formed on the image bearers 2Y, 2M, and 2C in the process units 1Y, 1M, and 1C for the colors, and color toner images are transferred to the intermediate transfer belt 16 such that the color toner images are superimposed on each other.

The intermediate transfer belt 16 to which the color toner images are transferred and superimposed reaches the secondary transfer nip between the secondary transfer roller 20 and the drive roller 18. The registration roller pair 250 rotates to nip the sheet P contacting the registration roller pair 250 at a predetermined timing and conveys the sheet P to the secondary transfer nip of the secondary transfer roller 20 at a suitable timing to transfer the transferred and superimposed toner image formed on the intermediate transfer belt 16 onto the sheet P. In this manner, the toner image on the intermediate transfer belt 16 is transferred to the sheet P sent out by the registration roller pair 250.

The sheet P having the transferred toner image is conveyed to the fixing device 300 through the post-transfer conveyance path 33. The sheet P conveyed to the fixing device 300 is sandwiched by the fixing belt 310 and the pressure roller 320. Then, heating and pressing fixes the unfixed toner image to the sheet P. The sheet P fixed the toner image is sent out from the fixing device 300 to the post-fixing conveyance path 35.

The switching member 42 opens the upper end of the post-fixing conveyance path 35, as indicated with the solid line of FIG. 1A, when the fixing device 300 sends out the sheet P. The sheet P sent from the fixing device 300 is sent to the sheet ejection path 36 via the post-fixing conveyance path 35. The output roller pair 37 sandwiches the sheet P sent out to the sheet ejection path 36 and rotates to eject the sheet P to the output tray 44. Then, the single-sided printing finishes.

Next, duplex printing is described. As in the case of single-sided printing described above, the fixing device 300 sends out the sheet P to the sheet ejection path 36. In the duplex printing, the output roller pair 37 rotates to convey a part of the sheet P outside the image forming apparatus 100.

When the trailing edge of the sheet P passes through the sheet ejection path 36, the switching member 42 pivots on the pivot shaft 42a as indicated with a dotted line in FIG. 1A to close the upper end of the post-fixing conveyance path 35. When the upper end of the post-fixing conveyance path 35 is closed, nearly simultaneously, the output roller pair 37 rotates in reverse to convey the sheet P to an inner side of the image forming apparatus 100, that is, to the reverse conveyance path 41.

The sheet P sent out to the reverse conveyance path 41 reaches the registration roller pair 250 via the reverse conveyance roller pair 43. The registration roller pair 250 feeds the sheet P to the secondary transfer nip at a suitable timing to transfer the toner image formed on the intermediate transfer belt 16 onto the other surface of the sheet P to which no toner image has been transferred.

When the sheet P passes through the secondary transfer nip, the secondary transfer roller 20 and the drive roller 18 transfer the toner image to the other surface of the sheet P to which no toner image has been transferred (back face). The sheet P bearing the transferred toner image is conveyed to the fixing device 300 through the post-transfer conveyance path 33.

In the fixing device 300, the sheet P is sandwiched by the fixing belt 310 and the pressure roller 320, and heat and pressure are applied to fix the unfixed toner image formed on the back face of the sheet P. The sheet P bearing the toner images fixed to both front and back faces of the sheet P in this manner is conveyed from the fixing device 300 to the post-fixing conveyance path 35.

The switching member 42 opens the upper end of the post-fixing conveyance path 35, as indicated with the solid line of FIG. 1A, when the fixing device 300 sends out the sheet P. The sheet P conveyed from the fixing device 300 is sent out to the sheet ejection path 36 via the post-fixing conveyance path 35. The output roller pair 37 sandwiches the sheet P sent out to the sheet ejection path 36 and rotates to eject the sheet P to the output tray 44 to finish duplex printing.

After the toner image on the intermediate transfer belt 16 is transferred onto the sheet P, residual toner remains on the intermediate transfer belt 16. The belt cleaner 21 removes the residual toner from the intermediate transfer belt 16. The waste-toner conveyance unit conveys the toner removed from the intermediate transfer belt 16 to the powder container 10, and the toner is collected inside the powder container 10.

Next, the heating device and first to fourth fixing devices 300 to 300c according to the embodiments of the present disclosure are further described below. The heating device according to the present embodiment heats the both end portions of the fixing belt 310 in the fixing device 300.

Figure 2A:
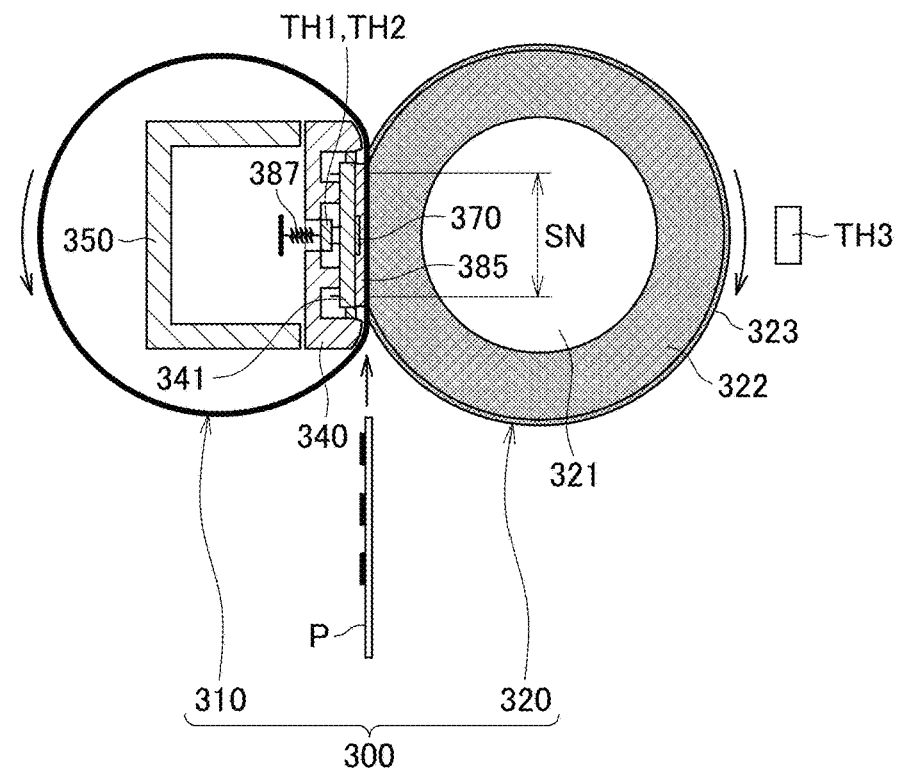
FIG. 2A is a cross-sectional view of a first fixing device according to an embodiment of the present disclosure.

FIG. 2A is a cross-sectional view of the first fixing device 300 according to the present embodiment. As illustrated in FIG. 2A, the first fixing device 300 includes a thin fixing belt 310 having low thermal capacity and a pressure roller 320. The fixing belt 310 includes, for example, a tubular base made of polyimide (PI), the tubular base having an outer diameter of 25 mm and a thickness of from 40 to 120 μm.

The fixing belt 310 further includes a release layer serving as an outermost surface layer. The release layer is made of fluororesin, such as perfluoroalkoxy alkane (PFA), tetrafluoroethylene-perfluoroalkylvinylether copolymer (PFA), and polytetrafluoroethylene (PTFE), and has a thickness of from 5 μm to 50 μm to enhance durability of the fixing belt 310 and facilitate separation of the sheet P from the fixing belt 310. An elastic layer made of rubber having a thickness of from 50 to 500 μm may be provided between the base and the release layer.

The base of the fixing belt 310 may be made of heat-resistant resin such as polyetheretherketone (PEEK) or metal such as nickel (Ni) or stainless steel (Stainless Used Steel, SUS), instead of polyimide. The inner circumferential surface of the fixing belt 310 may be coated with polyimide (PI) or polytetrafluoroethylene (PTFE) as a sliding layer.

The pressure roller 320 having, for example, an outer diameter of 25 mm, includes a solid iron core 321, an elastic layer 322 on the surface of the solid iron core 321, and a release layer 323 formed on the outside of the elastic layer 322. The elastic layer 322 is made of silicone rubber and has a thickness of 3.5 mm, for example.

Preferably, the release layer 323 is formed by a fluororesin layer having, for example, a thickness of approximately 40 μm on the surface of the elastic layer 322 to improve releasability. A biasing member presses the pressure roller 320 against the fixing belt 310.

A stay 350 and a heater holder 340 are disposed in axial direction inside the loop of the fixing belt 310. The stay 350 is made of a metal channel material, and both side plates of the fixing device 300 support both end portions of the stay 350. The stay 350 reliably receives the pressing force of the pressure roller 320 to form the fixing nip SN stably.

The heater holder 340 holds the base 341 of the fixing device 300 and is supported by the stay 350. Preferably, the heater holder 340 is made of heat-resistant resin having low thermal conduction, such as a liquid crystal polymer (LCP). This reduces heat transfer from the heater to the heater holder 340 and enables efficient heating of the fixing belt 310.

The heater holder 340 has a shape that supports two portions of the base 341 near both end portions in a short side direction of the base 341 to avoid contact with a high-temperature portion of the base 341. This shape further reduces an amount of heat flowing to the heater holder 340 and enables the fixing belt 310 to be heated efficiently.

Thermistors TH1 and TH2 are arranged on the back face of the base 341 to detect the temperature of a resistance member 370, which will be described later in detail. The thermistors TH1 and TH2 are pressed against the back face of the base 341 by a spring 387, due to the configuration, the accurate temperature of the resistance member 370 can be detected.

One of the thermistors TH1 is disposed at the center of the small-sheet size in the width direction. The other of the thermistors TH2 is disposed at the non sheet-passing portion on the outer side of the large-sheet size in the width direction. Based on the temperature data from both thermistors TH1 and TH2, the electric power supplied to the resistance member 370 and the drive mechanism of a shutter described later are controlled.

A thermistor TH3, disposed opposing the outer peripheral surface of the pressure roller 320, can be substituted for the thermistor TH1 or TH2. By disposing the thermistor TH3 on the outside of the fixing belt 310, maintenance of the thermistor TH3 is easy.

Figure 2B:
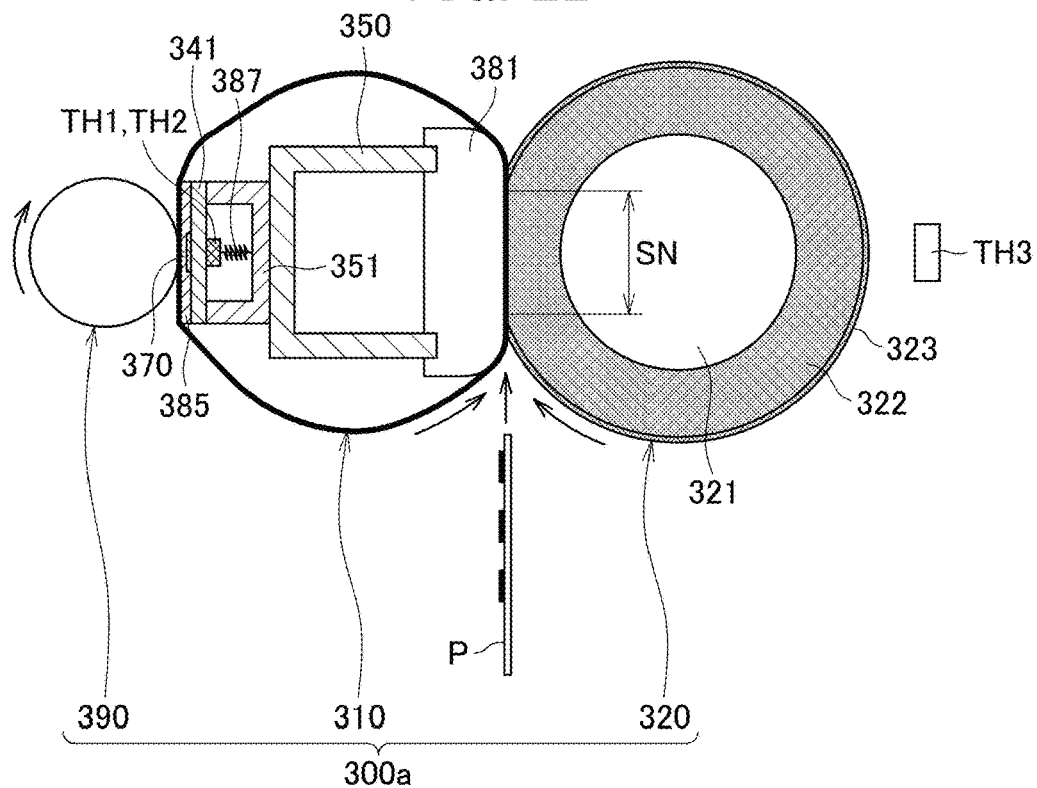
FIG. 2B is a cross-sectional view of a second fixing device according to an embodiment of the present disclosure.
Figure 2C:
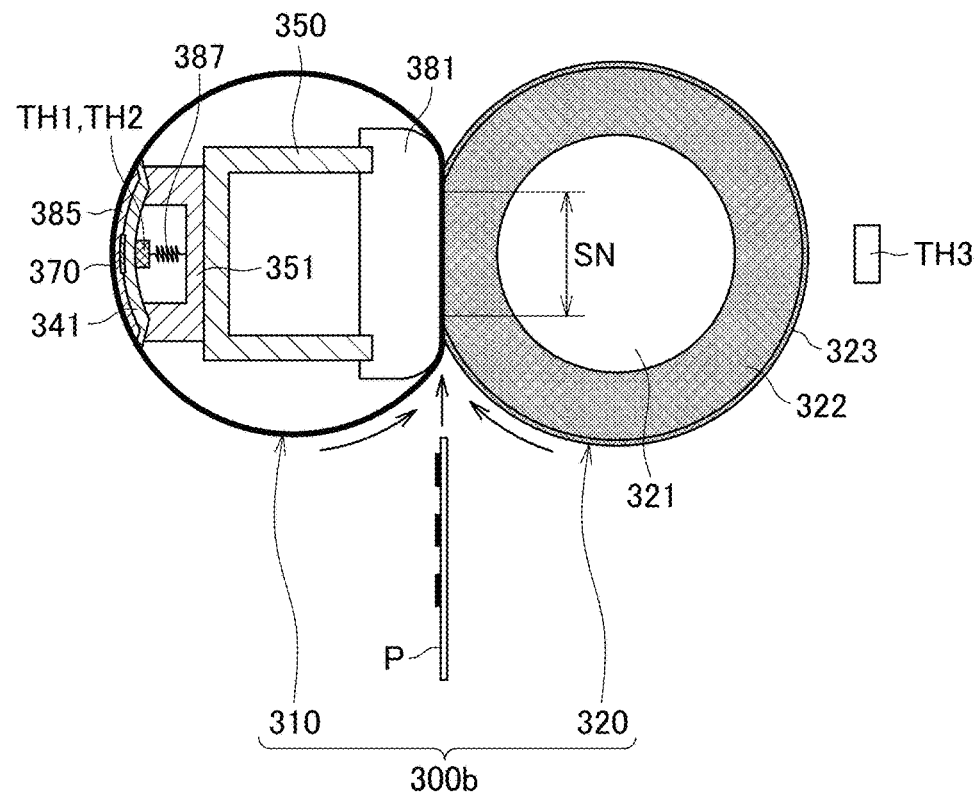
FIG. 2C is a cross-sectional view of a third fixing device according to an embodiment of the present disclosure.
Figure 2D:
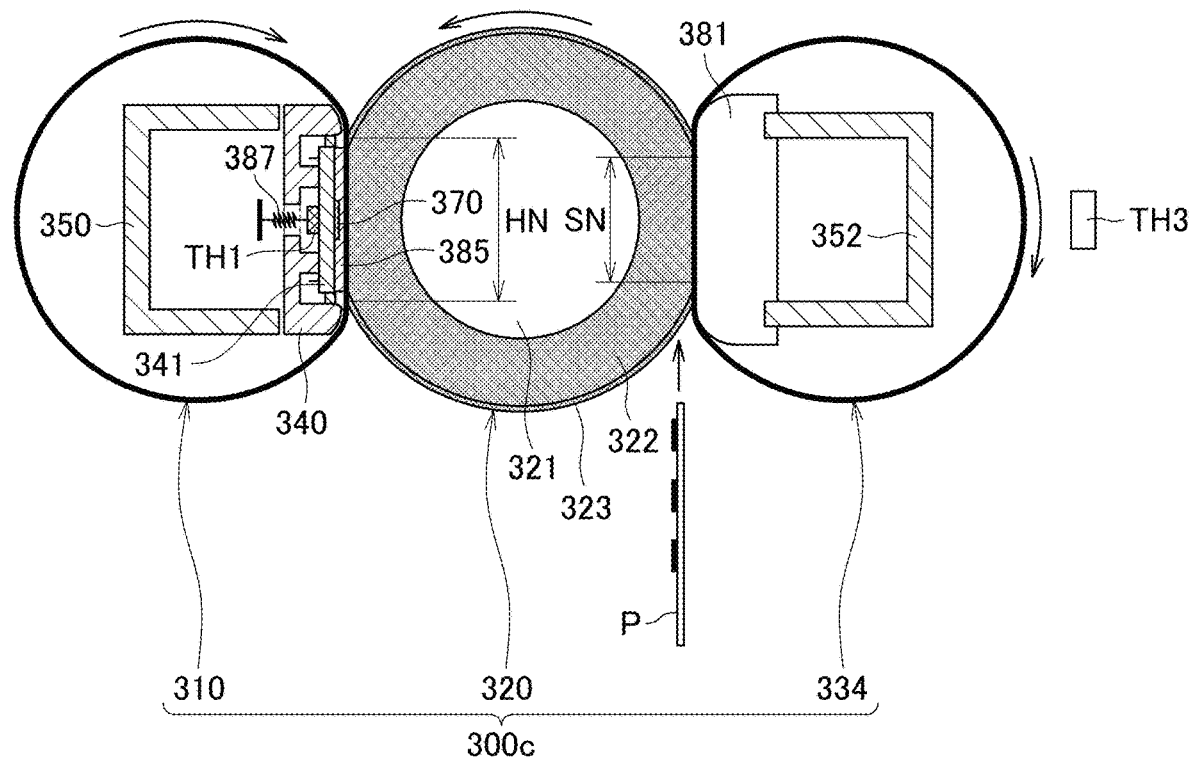
FIG. 2D is a cross-sectional view of a fourth fixing device according to an embodiment of the present disclosure.

The fixing device 300 can be of various types, and the first fixing device 300 in FIG. 2A described above is an example thereof. FIGS. 2B to 2D are cross-sectional views of the second to fourth fixing devices 300a to 300c, respectively, according to the present embodiment. As illustrated in FIG. 2B, the second fixing device 300a includes a pressing roller 390 on the opposite side of the pressure roller 320, and heats the fixing belt 310 sandwiched between the pressing roller 390 and the resistance member 370.

The heater described above is disposed inside the inner circumferential surface of the fixing belt 310. The stay 350 includes an auxiliary stay 351 attached on one side of the stay 350 and a nip formation pad 381 attached on the other side of the stay 350. The heater is held by the auxiliary stay 351. The nip formation pad 381 contacts the pressure roller 320 via the fixing belt 310 to form the fixing nip SN.

As illustrated in FIG. 2C, the third fixing device 300b includes the heater disposed inside the inner circumferential surface of the fixing belt 310. Instead of omitting the pressing roller 390 described above, the heater includes the base 341 and the insulation layer 385 both of which have arc-shaped cross sections meeting the curvature of the fixing belt 310 to lengthen a circumferentially contact length of the fixing belt 310. The resistance member 370 is disposed at the center of the arc-shaped base 341. Other parts of the third fixing device 300b are equivalent to the second fixing device 300a in FIG. 2B.

As illustrated in FIG. 2D, the fourth fixing device 300c includes a heating nip HN and the fixing nip SN separately. That is, the nip formation pad 381 and the stay 352 made of the metal channel material are disposed on one side of a pressure roller 320 opposite to the fixing belt 310, and a pressure belt 334 is arranged circumferentially rotatably, enveloping the nip formation pad 381 and the stay 352. The sheet P is passed through the fixing nip SN between the pressure belt 334 and the pressure roller 320 to be heated and fixed. Other parts of the fourth fixing device 300c are identical to the first fixing device 300 in FIG. 2A.

Figure 3A:
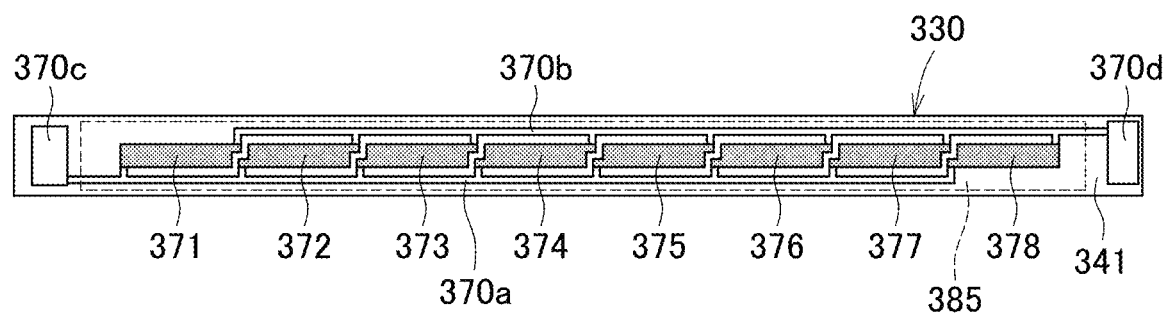
FIGS. 3A and 3B are plan views of a resistance member used in a fixing device according to an embodiment of the present disclosure.
Figure 3B:
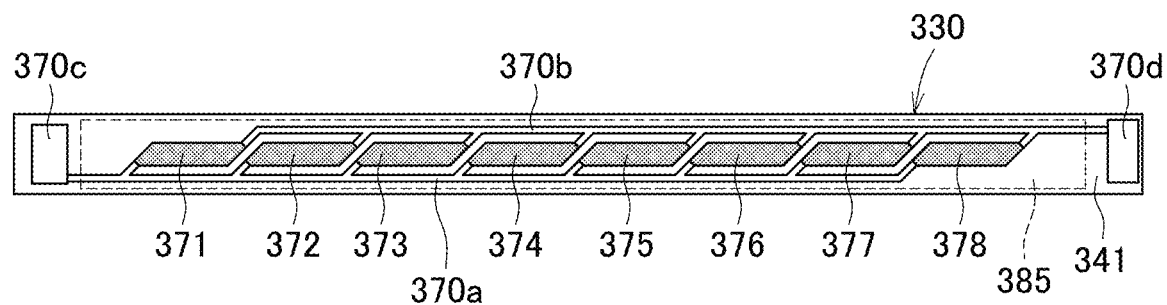

FIG. 3A and FIG. 3B are plan views of the resistance members 370 and a resistance member 330 that are used in the fixing device 300 according to the present embodiment of the present disclosure. The fixing devices 300 to 300c in FIGS. 2A to 2D have the resistance member 370 composed of planar heater such as a resistance heating element. The resistance member 370 can be formed of a plurality of types of elements like the resistance member 330 as illustrated in FIGS. 3A and 3B. In either type, the resistance members 370 and 330 are formed on the base 341 in which an elongated metal thin-plate member is coated with an insulating material. In the fixing method in which the fixing nip SN is heated by the planar heater, a plurality of types of sheet widths can be uniformly heated by dividing the resistance member, which is a heating element, into a plurality of pieces in the sheet width direction and controlling the heating individually.

As the material of the base 341, low-cost aluminum, stainless steel, or the like is preferable. However, the material of the base 341 is not limited to metal and alternatively may be a ceramic, such as alumina or aluminum nitride, or a nonmetallic material having excellent thermal resistance and insulating properties, such as glass or mica.

To improve thermal uniformity of the resistance members 330 and 370 and image quality, the base 341 may be made of a material having high thermal conductivity, such as copper, graphite, or graphene. The base 341 according to the present embodiment uses an alumina base having a lateral width of 8 mm, a longitudinal width of 270 mm, and a thickness of 1.0 mm.

As illustrated in FIGS. 3A and 3B, the resistance member 330 can be configured as a multi-type in which PTC elements 371 to 378 are electrically connected in parallel. As illustrated in FIGS. 3A and 3B, the resistance member 370 includes electrodes 370c and 370d. Assuming that the resistance value between the electrodes 370c and 370d at both ends of FIGS. 3A and 3B is 10Ω, the resistance value of each PTC element 371 to 378 is as large as 80Ω because of parallel connection.

The PTC element is made of a material having a positive temperature resistance coefficient, and has a characteristic that the resistance value increases as the temperature T increases (the current I decreases and the heater output decreases). The temperature coefficient of resistance (TCR) can be, for example, 1500 PPM (parts per million).

The PTC elements 371 to 378 illustrated in FIGS. 3A and 3B are arranged straight at regular intervals in the longitudinal direction of the base 341. As illustrated in FIGS. 3A and 3B, the resistance member 370 includes feeder lines 370a and 370b with a small resistance value that are arranged in parallel in a straight line on both sides of the PTC elements 371 to 378 in the short side direction. Both ends of each of the PTC elements 371 to 378 are connected to the feeder lines 370a and 370b. Then, AC power is supplied to the electrodes 370c and 370d formed at one end portion of each of the feeder lines 370a and 370b.

The PTC elements 371 to 378 and the feeder lines 370a and 370b are covered with a thin insulating layer 385. The insulating layer 385 may be, for example, a thermal resistance glass having a thickness of 75 μm. The insulating layer 385 insulates and protects the PTC elements 371 to 378 and the feeder lines 370a and 370b, and secures the slidability between the fixing belt 310 and the PTC elements 371 to 378 and the feeder lines 370a and 370b.

The PTC elements 371 to 378 may be made, for example, by coating on the base 341 with paste in which silver palladium (AgPd) and glass powder are compounded, by screen printing, and after that, by baking the base 341. In the present embodiment, each resistance value of the PTC elements 371 to 378 is set to 80Ω at room temperature, and the total resistance value results in 10Ω.

As the material of the PTC elements 371 to 378, other than the above material, a resistance material, such as silver alloy (AgPt) or ruthenium oxide (RuO2) may be used. Silver (Ag), silver palladium (AgPd) or the like may be used as a material of the feeder lines 370a and 370b and the electrodes 370c and 370d. Screen-printing such a material forms the feeder lines 370a and 370b and the electrodes 370c and 370d.

The PTC elements 371 to 378 transfer heat to the fixing belt 310 that contacts the insulation layer 385, raise the temperature of the fixing belt 310, and heats the unfixed toner image on the sheet P conveyed to the fixing nip SN to fix the toner image on the sheet P. By using the PTC elements 371 to 378, when the temperature of the PTC element in the non sheet-passing area rises due to small-sized sheet passing or the like, the calorific value of the PTC element decreases due to the temperature resistance dependence of the resistance heating element, and the temperature rise can be restrained.

For example, printing sheets smaller than a width corresponding to all PTC elements 371 to 378, for example, sheets having width corresponding to the PTC elements 373 to 376, raises temperatures in the PTC elements 371, 372, 377, and 378 disposed outside the sheets because the sheets do not draw heat from the PTC elements 371, 372, 377, and 378. Then, the resistance values of above-described PTC elements 371, 372, 377, and 378 increase.

Because a constant voltage is applied to the PTC elements 371 to 378, the increase in resistance values relatively reduces outputs of the PTC elements 371, 372, 377, and 378 disposed outside the width of the sheet, as a result, increase in temperature in side end portions outside the sheets is prevented. If the PTC elements 371 to 378 are electrically connected in series, to prevent the resistance heat generator outside the width of the sheets from raising temperature in continuous printing, there is no method except a method of reducing a print speed. Electrically connecting the PTC elements 371 to 378 in parallel can restrain the temperature rise of the non sheet-passing portion while maintaining the printing speed.

If there are gaps extending in the lateral direction between the PTC elements 371 to 378, the amount of heat generated is reduced in the gap portion, and thus fixing unevenness is likely to occur. Therefore, in FIGS. 3A and 3B, the ends of the PTC elements 371 to 378 are overlapped each other in the longitudinal direction.

In FIG. 3A, an L-shaped cut-away step is formed at each of the side end portions of the PTC elements 371 to 378 so that the step overlaps the step of the side end portion of the adjacent PTC element. In FIG. 3b, an oblique cut-away inclination is formed at each of the side end portions of the PTC elements 371 to 378 so that the inclination overlaps the inclination of the side end portion of the adjacent PTC element. By overlapping the ends of the PTC elements 371 to 378 with each other in this manner, the influence of a decrease in the amount of heat generated in the gaps between the PTC elements can be restrained.

The electrodes 370c and 370d can be arranged at both ends of the PTC elements 371 to 378, and can also be arranged on one side of the PTC elements 371 to 378. Disposing the electrodes 370c and 370d on the one side in this manner reduces a size of the fixing device in the longitudinal direction, which results in space saving.

However, each of the PTC elements 371 to 378 illustrated in FIGS. 3A and 3B is composed of strip-shaped planar heating elements, the line width may be narrowed to meander in order to obtain a desired output (resistance value), and a configuration in which multiple PTC elements are electrically connected in parallel can be selected.

Figure 4A:
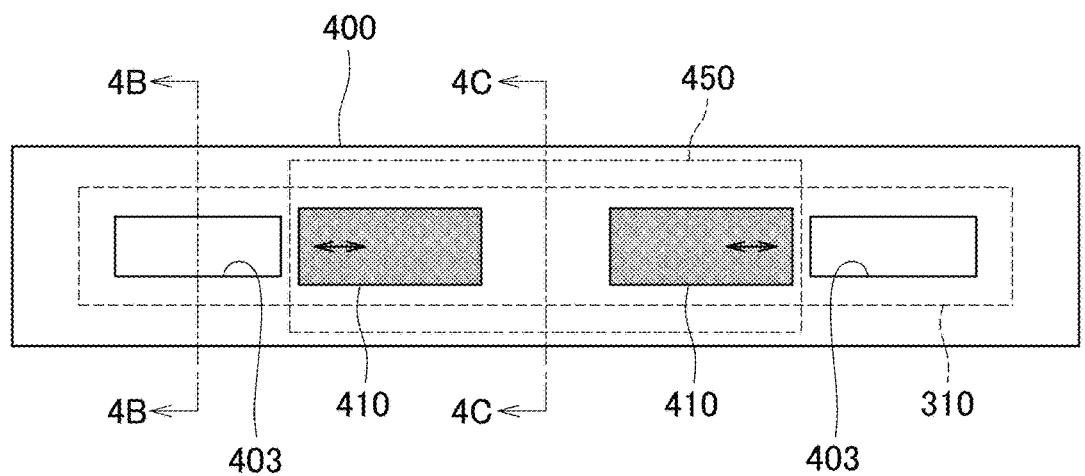
FIG. 4A is an external side view of the housing of a fixing device according to a first embodiment of the present disclosure.
Figure 4B:
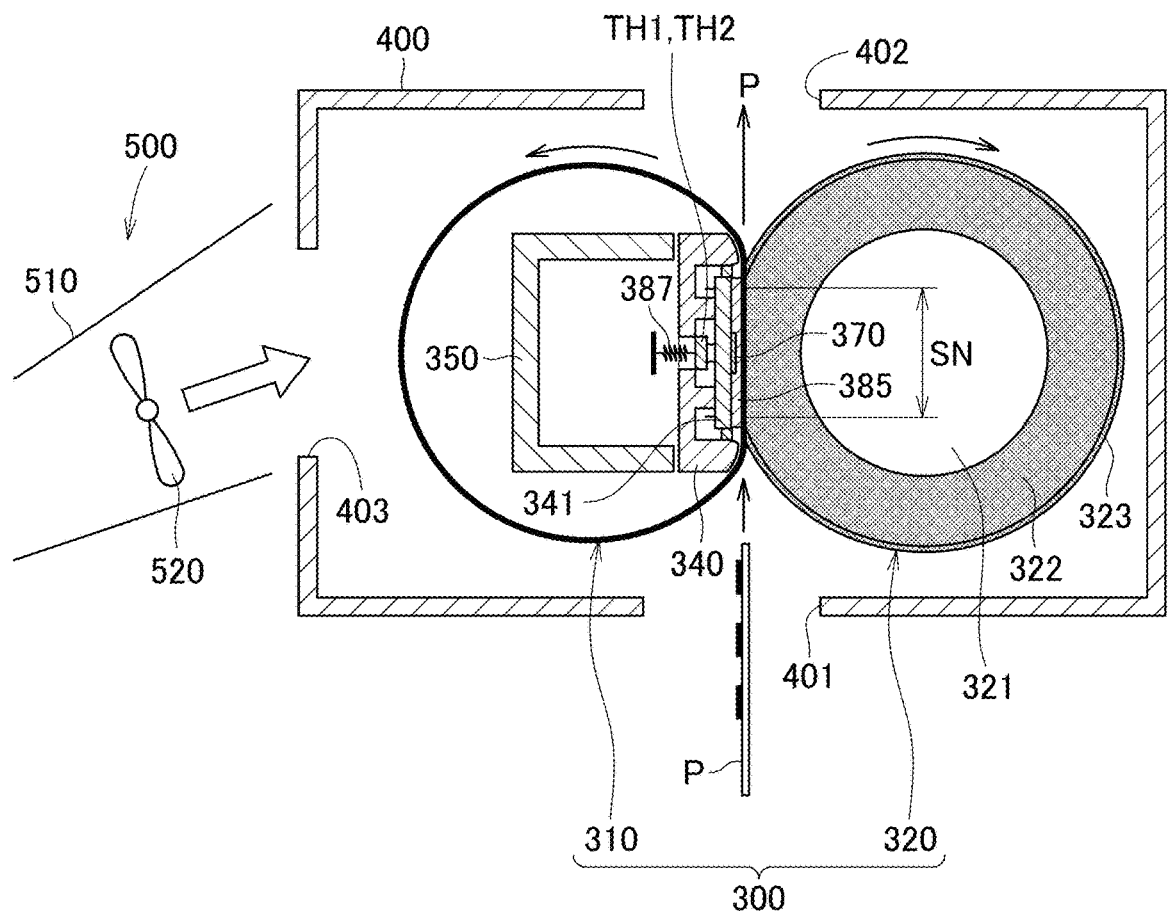
FIG. 4B is a cross-sectional view of the housing of a fixing device, as indicated by a line 4B-4B in FIG. 4A.
Figure 4C:
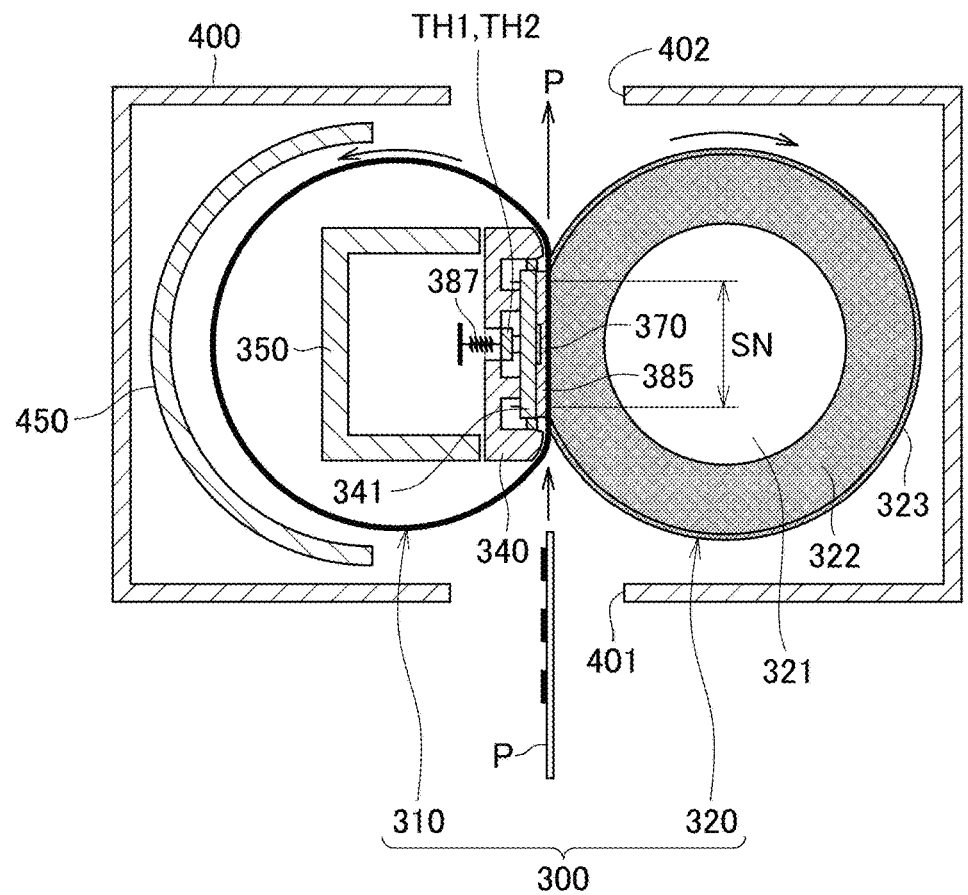
FIG. 4C is a cross-sectional view of the housing of a fixing device, as indicated by a line 4C-4C in FIG. 4A.

FIGS. 4A to 4E are diagrams each illustrating the fixing device 300 according to the first embodiment of the present disclosure. As illustrated in FIGS. 4B and 4C, the fixing belt 310 and the pressure roller 320 of the fixing device 300 that serve as a heating member and a pressure member, respectively, as described above, are stored in the housing 400 that serves as a cover.

An inlet 401 and an outlet 402 are formed above and below the housing 400. The inlet 401 and the outlet 402 face each other in a direction (vertical direction in FIGS. 4B and 4C) crossing the longitudinal direction (axial direction perpendicular to the surface of the paper) of the fixing belt 310. The sheet member bearing the toner image enters from the inlet 401, passes through the fixing nip SN, and exits from the outlet 402.

A pair of openings 403 are formed on one side face of the housing 400. As illustrated in FIGS. 4A and 4B, the pair of openings 403 face both ends of the fixing belt 310 in the longer-side directions, and an air duct 510 is connected to each one of the openings 403. A blower fan 520 is disposed in the air duct 510 outside the opening 403. Cooling air is supplied to the opening 403 by the blower fan 520.

Figure 4D:
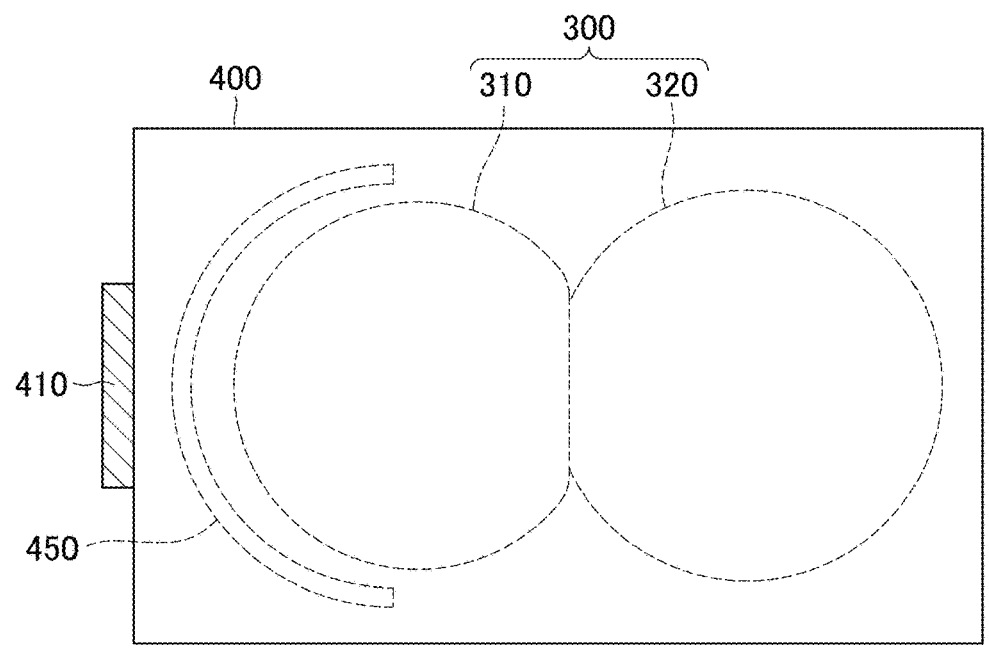
FIG. 4D is a longitudinal-side end view of the housing of the fixing device of FIG. 4A.

As illustrated in FIGS. 4A and 4D, the amount of supplied cooling air can be adjusted by changing the degree of opening of a pair of right and left shutters 410 that are arranged on the outside of the pair of openings 403. The pair of shutters 410 are arranged so as to be slidable in the longitudinal direction of the housing 400, and slides in the longitudinal direction by a drive mechanism such as a rack and pinion mechanism. The rack and pinion mechanism is a combination of a plate-shaped or rod-shaped gear called a rack having an infinite diameter of a cylindrical gear and a small gear (cylindrical gear) called a pinion.

The pair of shutters 410 can be a press-molded product of heat-resistant sheet metal. By making the pair of shutters 410 a press-molded product, the accuracy of the shutter 410 can be improved.

Attaching a thermal insulator (thermal insulating member) such as felt or sponge to the inner surface of the pair of shutters 410 is desirable to improve the thermal insulating property. Further, even when the pair of shutters 410 are made of heat-resistant resin, the thermal insulator can be attached to the back face thereof.

As illustrated in FIGS. 4C and 4D, a thermal insulator 450 is disposed in the housing 400 between the pair of openings 403. The thermal insulator 450 is disposed along the outer circumference of the left half of the central portion in the longitudinal direction of the fixing belt 310. The thermal insulator 450 is made of a heat-resistant sheet metal having an arcuate cross section, such as SUS, a heat-resistant resin having a low thermal conductivity, or foam rubber, or is made by compression-molding an inorganic fiber such as rock wool or glass wool.

Since the thermal insulator 450 makes it difficult for the heat in the central portion of the fixing belt 310 in the longitudinal direction to escape to the outside, the following effects can be obtained. 1; The amount of heat generated from the fixing belt 310 can be reduced. 2; Temperature rise in the non sheet-passing area at both ends of the fixing belt 310 can be restrained. 3; The warm-up time of the fixing device 300 can be shortened. 4; Decrease of productivity (limitation on the number of prints and extension of machine downtime) due to the increase of temperature in the both ends of the fixing belt 310 can be restrained The thermal insulator 450 can be composed of a heat-resistant reflector having an inner face on the fixing belt 310 side as a reflection face. By using the reflector, the thermal insulating effect of the fixing belt 310 can be further enhanced, and the amount of heat generated by the entire fixing device 300 can be further reduced, so that energy saving can be improved. Such a reflector can be composed of, for example, an aluminum substrate, a silver paste applied to the surface of the substrate, and an antioxidant layer on the uppermost layer.

Figure 4E:
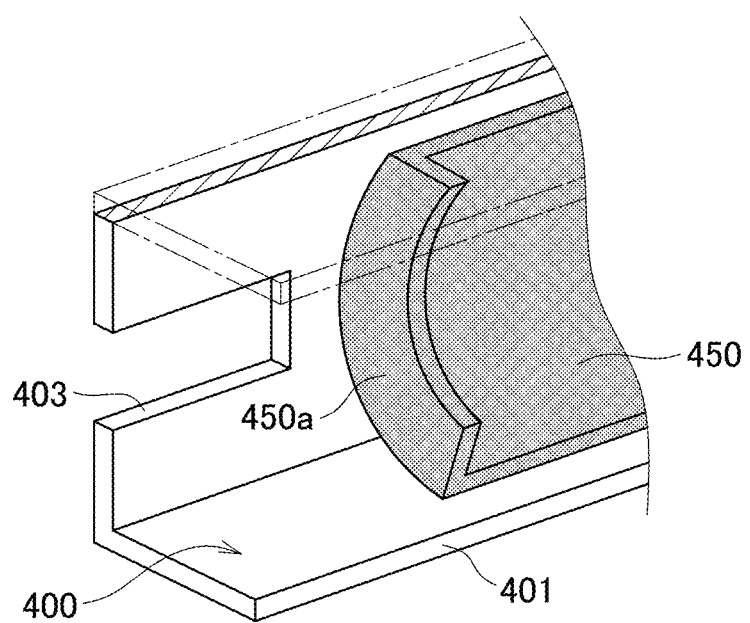
FIG. 4E is an internal perspective view of the housing of the fixing device of FIG. 4A.

As illustrated in FIG. 4E, a partition wall 450a projecting in the inner direction of the housing 400, that is, on the fixing belt 310 side in the radial direction of the belt can be formed at the end portion of the thermal insulator 450 on the opening 403 side. The partition wall 450a can prevent the cooling air flowing from the air duct 510 from flowing into the outer peripheral surface of the central portion in the longitudinal direction of the fixing belt 310 facing the thermal insulator 450.

The partition wall 450a prevents a part of the cooling air blown from the air duct 510 from flowing toward the central portion in the longitudinal direction of the fixing belt 310. As a result, a lowering of the fixing temperature of the fixing belt 310 and an occurrence of defective fixing can be prevented. Further, a wasteful power consumption of the resistance member 370 for preventing the fixing temperature from dropping in the central portion of the fixing belt 310 in the longitudinal direction can be eliminated.

Figure 5A:
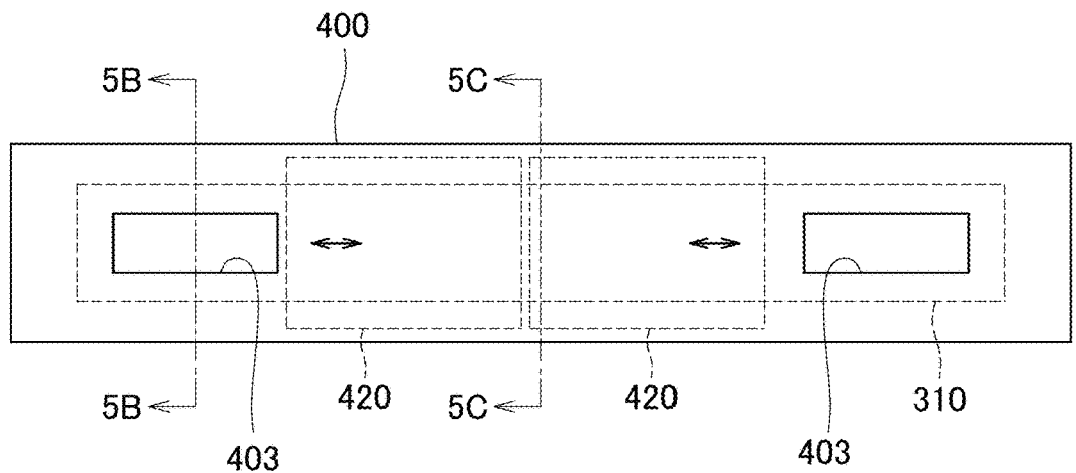
FIG. 5A is an external side view of the housing of a fixing device according to a second embodiment of the present disclosure.
Figure 5B:
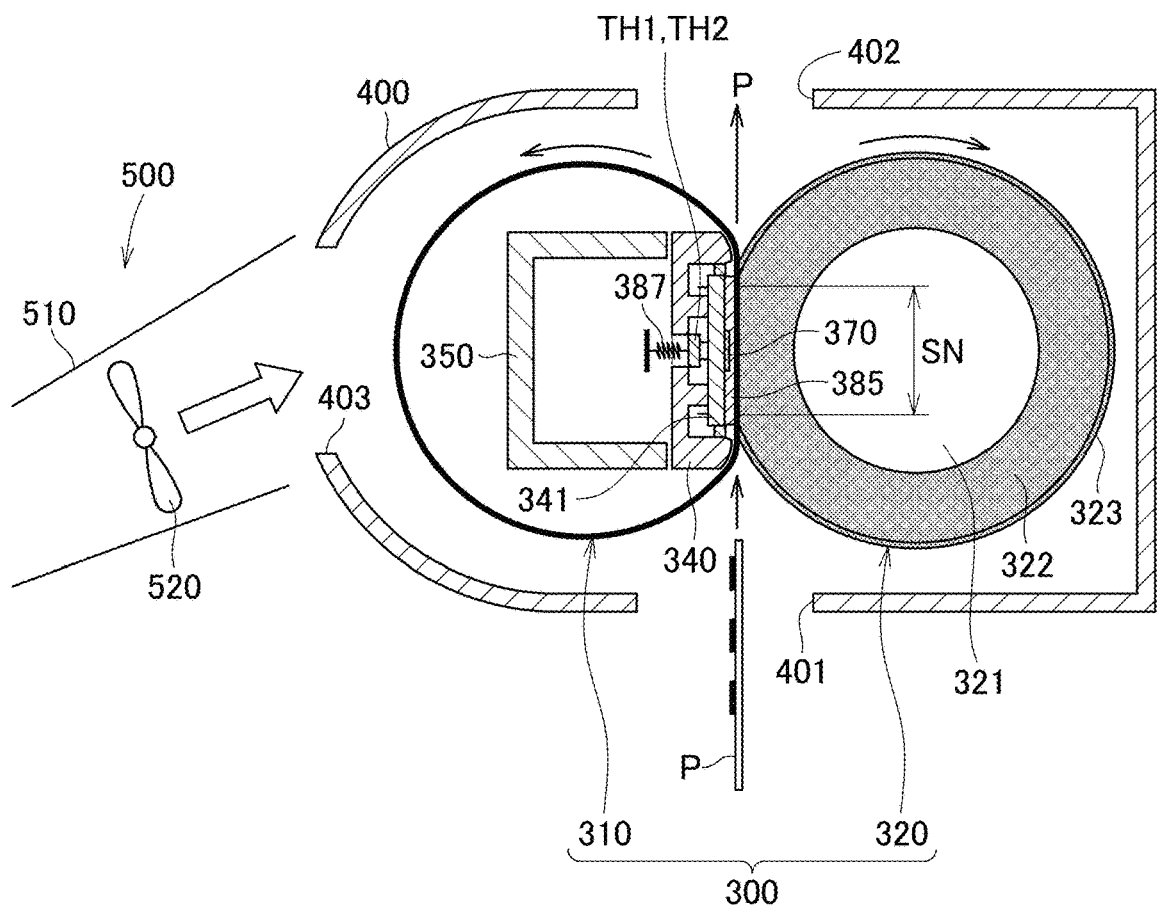
FIG. 5B is a cross-sectional view of the housing of a fixing device, as indicated by a line 5B-5B in FIG. 5A.
Figure 5C:
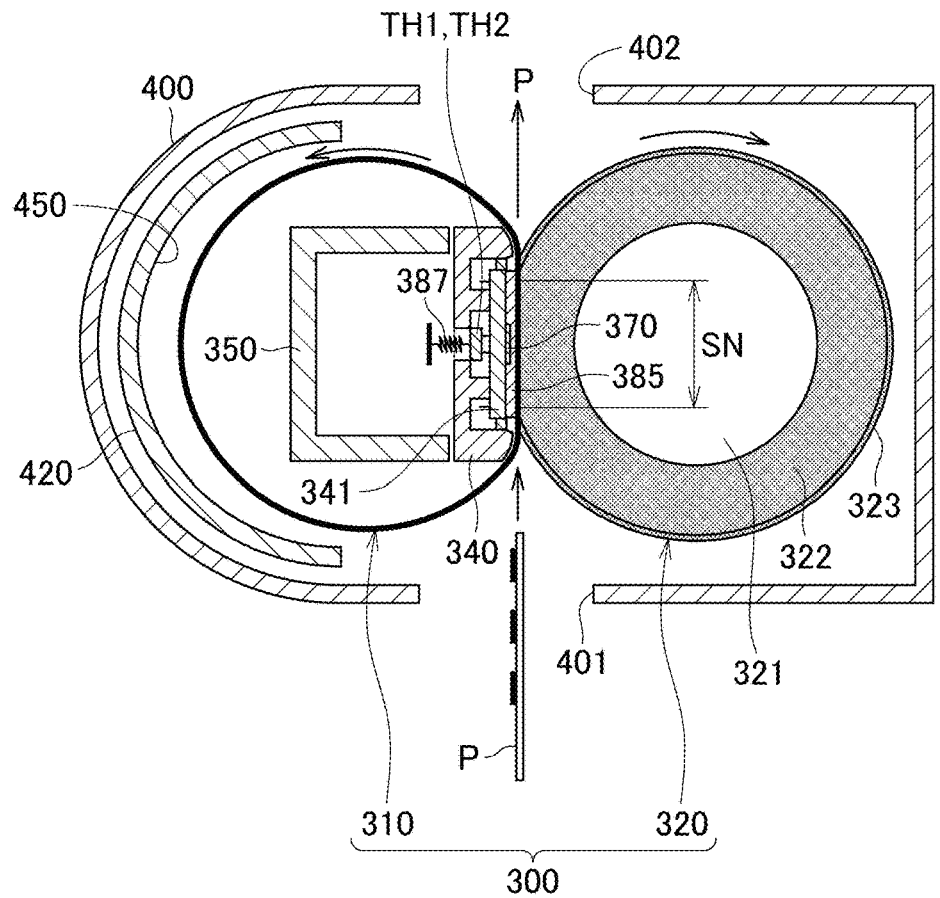
FIG. 5C is a cross-sectional view of the housing of a fixing device, as indicated by a line 5C-5C in FIG. 5A.
Figure 5D:
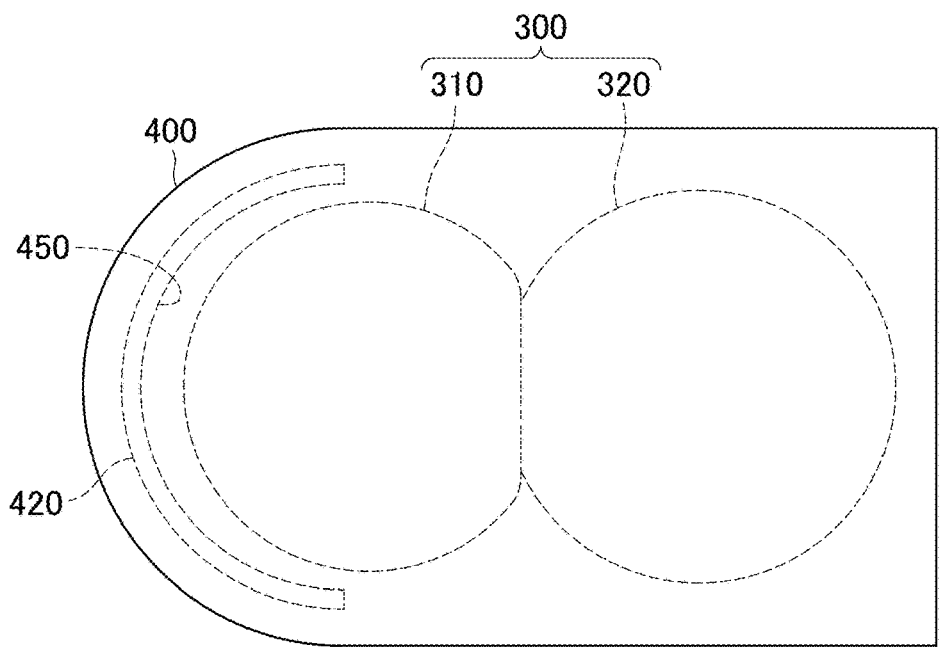
FIG. 5D is a longitudinal-side end view of the housing of the fixing device of FIG. 5A.

FIGS. 5A to 5E are diagrams each illustrating the fixing device 300 according to the second embodiment of the present disclosure. The fixing device 300 includes a pair of shutters 420 that open and close the opening 403 inside the housing 400. As illustrated in FIG. 5C, the shutter 420 is formed in an arc shape in cross section along the outer circumference of the left half of the fixing belt 310. The shutter 420 may be disposed on the outside of the housing 400. The shutter 420 can be a press-molded product of heat-resistant sheet metal. By making the shutter 420 press-molded product, the accuracy of the shutter 420 can be improved.

The shape of the housing 400 is different from the shape of FIGS. 4A to 4E, and the left half of the housing 400 is formed with an arcuate cross section. The shutter 420 having an arcuate cross section is disposed close to the inside of the arcuate cross section of the housing 400. The thermal insulator 450 made of the above-described material is disposed on the inner face of the shutter 420 facing the fixing belt 310.

By using the thermal insulator 450, the following effects can be obtained. 1; Since the left half of the fixing belt 310 is covered with the thermal insulator 450 when the shutter 420 is opened, the amount of heat generated from the fixing belt 310 can be reduced. 2; Temperature rise in the non sheet-passing area at both ends of the fixing belt 310 can be restrained. 3; The warm-up time of the fixing device 300 can be shortened. 4; Decrease of productivity (limitation on the number of prints and extension of machine downtime) due to the increase of temperature in the both ends of the fixing belt 310 can be restrained.

Figure 5E:
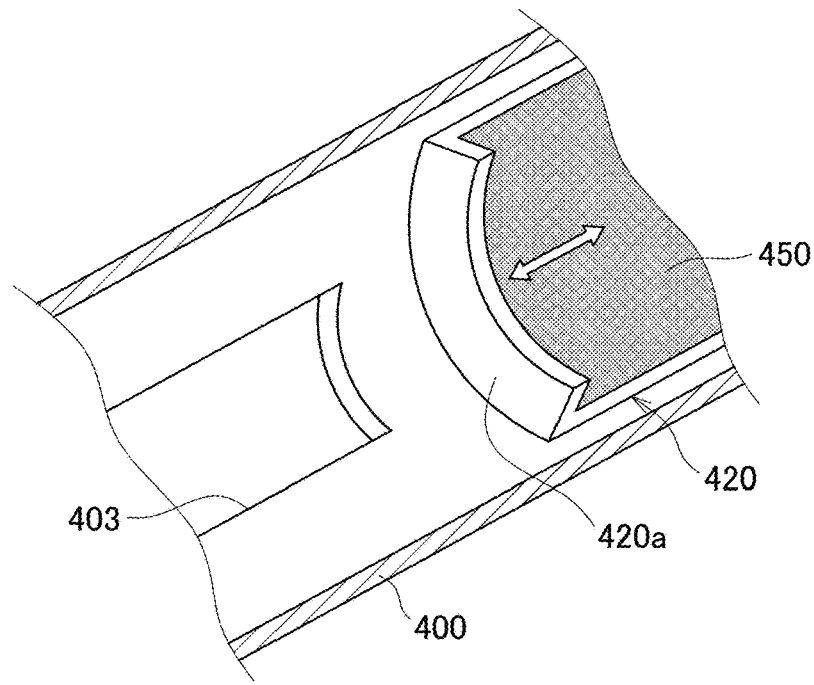
FIG. 5E is an internal perspective view of the housing of the fixing device of FIG. 5A.

As illustrated in FIG. 5E, a partition wall 420a projecting in the inner direction of the housing 400, that is, on the fixing belt 310 side can be formed at the end portion of the shutter 420 on the opening 403 side. The partition wall 420a can prevent the cooling air blown from the opening 403 from flowing into the outer peripheral surface of the fixing belt 310 facing the thermal insulator 450. Further, when the shutter 420 is closed, the thermal insulating effect of the fixing belt 310 can be enhanced by the partition wall 420a.

Although the partition wall 420a of FIG. 5E is formed by extending the shutter 420, the partition wall 420a can also be formed by the thermal insulator 450. When the thermal insulator 450 is formed, not only the above-described effect of restraining the inflow of cooling air but also the effect of further enhancing the thermal insulating effect of the fixing belt 310 can be expected.

The partition wall 420a prevents a part of the cooling air blown from the opening 403 from flowing toward the central portion in the longitudinal direction of the fixing belt 310. As a result, a lowering of the fixing temperature of the fixing belt 310 and an occurrence of defective fixing can be prevented. Further, a wasteful power consumption of the resistance member 370 for preventing the fixing temperature from dropping in the central portion of the fixing belt 310 in the longitudinal direction can be eliminated.

However, the thermal insulator 450 is formed on the inner surface of the shutter 420 of the second embodiment in FIGS. 5A to 5E. The thermal insulator 450 of the first embodiment, that is, the thermal insulator 450 disposed in the housing 400 between the pair of openings 403 may be additionally disposed in the second embodiment as the second thermal insulator. In this case, the thermal insulator 450 is directly formed on the inner face of the housing 400 between the pair of openings 403 so as not to interfere with the sliding movement of the shutter 420.

As a result, when the shutter 420 is closed, the thermal insulating effect of the fixing belt 310 by the second thermal insulator 450 on the inner face of the housing 400 can be obtained. Further, when the shutter 420 is opened, the thermal insulator 450 of the shutter 420 and the second thermal insulator 450 on the inner face of the housing 400 are doubled to enhance the thermal insulating effect of the fixing belt 310.

Figure 6:
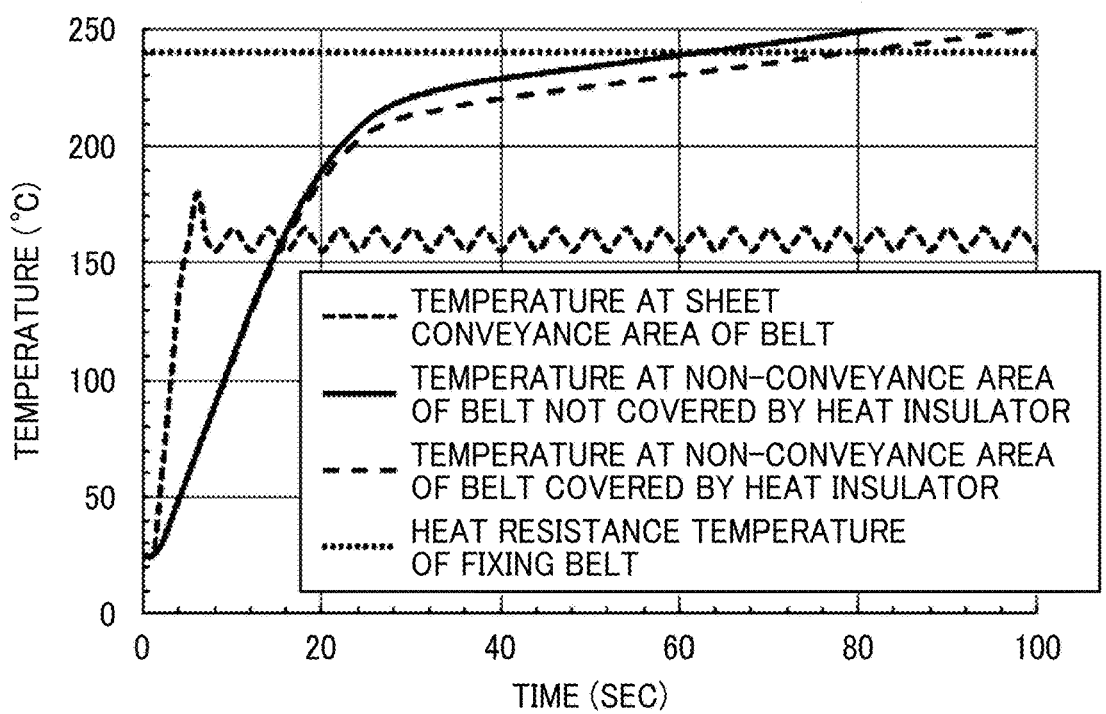
FIG. 6 is a graph illustrating a difference in temperature rise at the side ends of a fixing belt depending on the presence or absence of a thermal insulator.

FIG. 6 is a graph illustrating the difference in temperature rise at the side ends of the fixing belt depending on the presence or absence of the thermal insulator, according to the above embodiments of the present disclosure. More specifically, the temperature changes on the fixing belt 310 while small-size sheets are being printed out continuously are described with reference to FIG. 6. The temperature of the fixing belt in the sheet-passing area stably changes at a fixing temperature slightly higher than 150° C. On the other hand, in the case of a fixing device not provided with a thermal insulator as in the conventional case, as illustrated by a solid line in FIG. 6, the temperature of the non sheet-passing area of the fixing belt 310 reaches the heat-resistant temperature of the fixing belt 310 in about 60 seconds from the start of printing.

In contrast, in the case of the fixing device 300 provided with the thermal insulator 450 as in the embodiment of the present disclosure, as illustrated by the broken line in FIG. 6, the time until the heat-resistant temperature of the fixing belt 310 is exceeded can be delayed by about 20 seconds. As a result, decrease of productivity (limitation on the number of prints and extension of machine downtime) can be restrained.

Figure 7A:
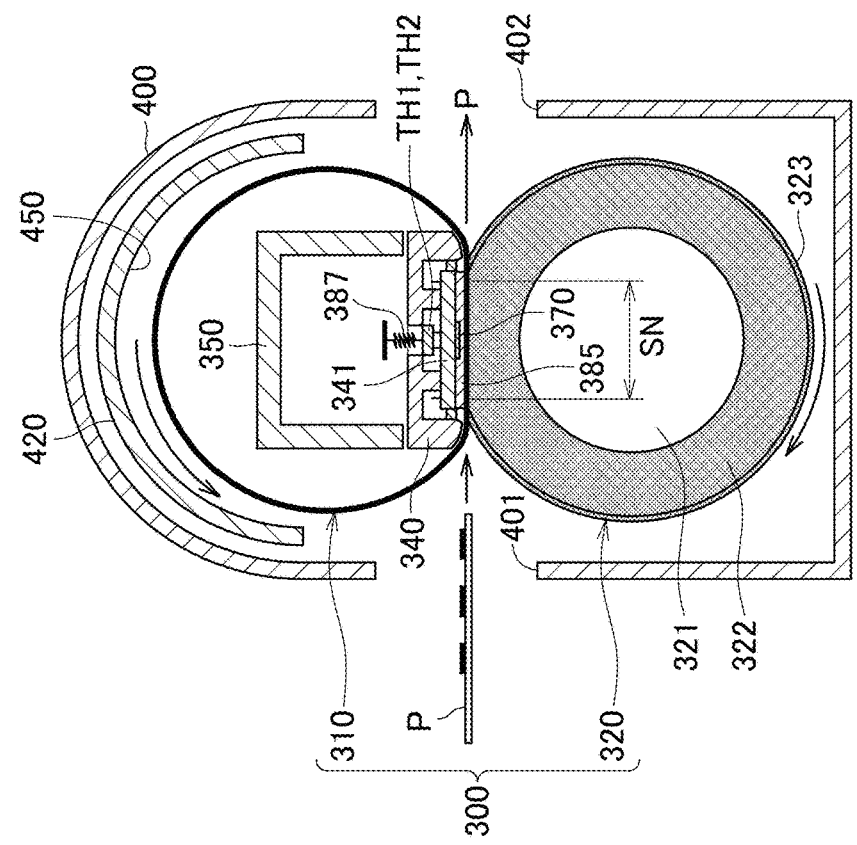
FIG. 7A is a cross-sectional view of a fixing device, where a thermal insulator is arranged above the fixing belt, according to the first embodiment of the present disclosure.
Figure 7B:
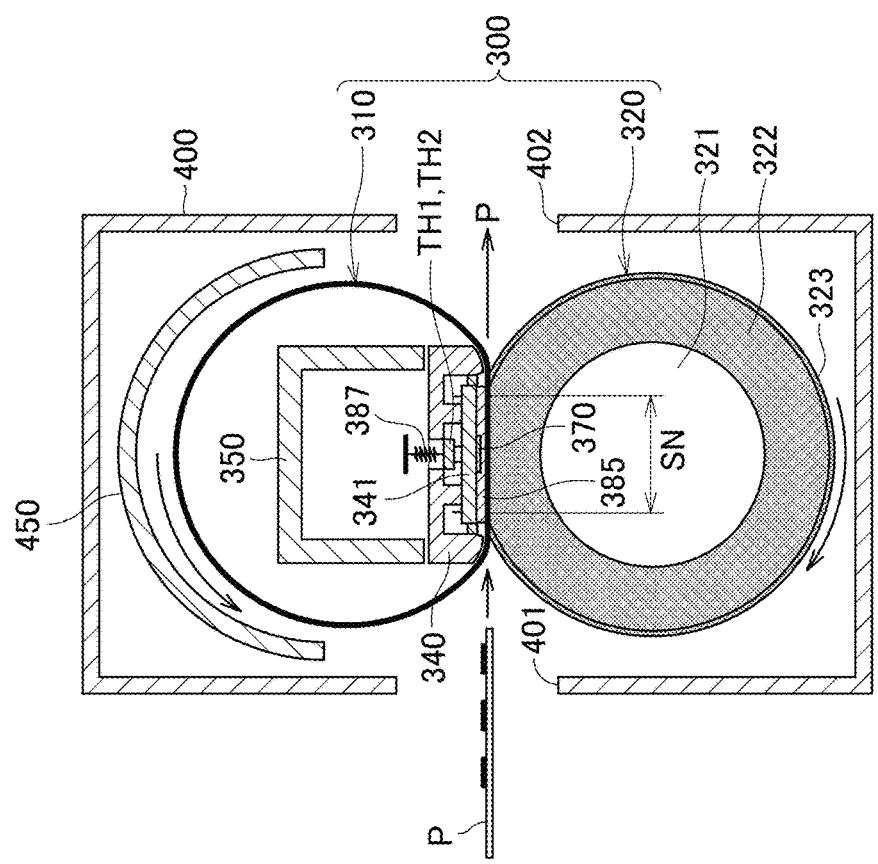
FIG. 7B is a cross-sectional view of a fixing device, where a thermal insulator is arranged above the fixing belt, according to the second embodiment of the present disclosure The accompanying drawings are intended to depict embodiments of the present disclosure and should not be interpreted to limit the scope thereof. The accompanying drawings are not to be considered as drawn to scale unless explicitly noted.

FIG. 7A is cross-sectional view of the fixing device 300 that is vertically arranged, where the thermal insulator 450 is arranged above the fixing belt 310, according to the first embodiment of the present disclosure as illustrated in FIGS. 4A to 4E. FIG. 7B is cross-sectional view of the fixing device 300 that is vertically arranged, where the thermal insulator 450 is arranged above the fixing belt 310, according to the second embodiment of the present disclosure as illustrated in FIGS. 5A to 5E. Since most of the amount of heat generated from the fixing belt 310 moves upward, disposing the above-described thermal insulator 450 at a position above the fixing belt 310 is desirable to enhance the thermal insulating effect.

By disposing the thermal insulator 450 at an upper position of the fixing belt 310 as illustrated in FIGS. 7A and 7B, the heat outflow from the housing 400 to the outside can be effectively restrained. In FIGS. 7A and 7B, since the inlet 401 and the outlet 402 of the housing 400 are located on the left and right sides of the housing 400, the conveying direction of the sheet P is horizontal.

The present disclosure is not limited to the details of the embodiments described above, and various modifications and improvements are possible. For example, the heating device of the present disclosure can be used not only for the fixing device 300 described above, but also for a sheet drying device for an inkjet printer. Further, as the heating element to heat the fixing belt 310, in addition to the resistance members 330 and 370, other heating elements such as a ceramic heater can also be used.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A heating device comprising:
a housing;
a heating member and a pressure member extending along a longitudinal direction and pressing each other to form a nip portion in the housing, the heating member being configured to transfer heat to a recording medium passing through the nip portion;
a pair of openings disposed in the housing and configured to open facing both end portions in the longitudinal direction of the heating member so that air passes through the pair of openings; and
a first thermal insulator disposed inside the housing between the pair of openings and configured to face an outer peripheral surface of the heating member;
a pair of shutters configured to open and close the pair of openings; and
a second thermal insulator disposed on each of the pair of shutters and configured to face an outer peripheral surface of the heating member.

2. The heating device according to claim 1, wherein the pair of shutters are further configured to move in the longitudinal direction of the heating member.

3. The heating device according to claim 1, wherein the first thermal insulator is made of a sheet metal.

4. The heating device according to claim 1, wherein the first thermal insulator is made of a reflector.

5. The heating device according to claim 1, further comprising a partition wall protruding toward the heating member at an end of the first thermal insulator in the longitudinal direction of the heating member.

6. The heating device according to claim 1, wherein the first thermal insulator is disposed above the heating member.

7. A fixing device comprising the heating device according to claim 1, wherein the heating device is configured to heat the recording medium passing through the nip portion to fix a toner image on the recording medium.

8. An image forming apparatus comprising the fixing device according to claim 7.

9. The heating device according to claim 1, wherein the second thermal insulator comprises a sponge attached to an inner surface of the pair of shutters.

10. The heating device according to claim 1, wherein the second thermal insulator comprises a felt material attached to an inner surface of the pair of shutters.

11. A heating device comprising:
a housing;
a heating member and a pressure member extending along a longitudinal direction and pressing each other to form a nip portion in the housing, the heating member being configured to transfer heat to a recording medium passing through the nip portion;
a pair of openings disposed in the housing and configured to open facing both end portions in the longitudinal direction of the heating member so that air passes through the pair of openings;
a pair of shutters configured to:
move in the longitudinal direction of the heating member;
open and close the pair of openings; and
a thermal insulator disposed on each of the pair of shutters and configured to face an outer peripheral surface of the heating member.

12. The heating device according to claim 11, further comprising a second thermal insulator disposed inside the housing between the pair of openings and configured to face an outer peripheral surface of the heating member.

13. The heating device according to claim 12, further comprising a partition wall protruding toward the heating member at an end of the second thermal insulator disposed inside the housing between the pair of openings in the longitudinal direction of the heating member.

14. The heating device according to claim 12, wherein the second thermal insulator is disposed above the heating member.

15. The heating device according to claim 11, wherein the thermal insulator disposed on each of the pairs of shutters comprises a sheet metal.

16. The heating device according to claim 11, wherein the thermal insulator disposed on each of the pairs of shutters comprises a reflector.

17. A fixing device comprising the heating device according to claim 11, wherein the heating device is configured to heat the recording medium passing through the nip portion to fix a toner image on the recording medium.

18. The heating device according to claim 11, wherein the thermal insulator comprises a sponge attached to an inner surface of the pair of shutters.

19. The heating device according to claim 11, wherein the thermal insulator comprises a felt material attached to an inner surface of the pair of shutters.

* * * * *